United States Patent
Cho et al.

(10) Patent No.: US 7,869,712 B2
(45) Date of Patent: Jan. 11, 2011

(54) METHOD AND APPARATUS FOR INCREASING TRANSMISSION CAPACITY IN OPTICAL TRANSPORT NETWORK

(75) Inventors: Hyunwoo Cho, Daejeon (KR); Sae Kyoung Kang, Jeollabuk-do (KR); Jong-Yoon Shin, Daejeon (KR); Je Soo Ko, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 680 days.

(21) Appl. No.: 11/854,892

(22) Filed: Sep. 13, 2007

(65) Prior Publication Data
US 2008/0131117 A1    Jun. 5, 2008

(30) Foreign Application Priority Data
Dec. 5, 2006   (KR)   ............ 10-2006-0122638
Apr. 4, 2007   (KR)   ............ 10-2007-0033348

(51) Int. Cl.
*H04J 14/02* (2006.01)
(52) U.S. Cl. ............ 398/79; 398/45; 398/135; 370/535; 370/537; 370/401
(58) Field of Classification Search ............ 398/79, 398/45, 58, 59, 98, 141, 183, 68, 140, 135, 398/136, 137, 138, 139, 164; 370/535, 537, 370/538, 539, 474, 536, 907, 542, 401
See application file for complete search history.

(56) References Cited

U.S. PATENT DOCUMENTS 7,099,584 B1 *  8/2006  Narvaez et al. ............ 398/58
2002/0012141 A1 *  1/2002  Traverso ............ 359/124
2002/0126712 A1 *  9/2002  Mueller ............ 370/537
2004/0062277 A1 *  4/2004  Flavin et al. ............ 370/474

FOREIGN PATENT DOCUMENTS

| KR | 2004-0026540 | 3/2004 |
|---|---|---|
| KR | 1020040026540 | 3/2004 |
| KR | 2005-0051226 | 6/2005 |
| KR | 2006-0056724 | 5/2006 |
| WO | WO-2006/021553 | 3/2006 |

\* cited by examiner

*Primary Examiner*—Hanh Phan
(74) *Attorney, Agent, or Firm*—Rabin & Berdo, P.C.

(57) ABSTRACT

Provided are a method and apparatus for increasing transmission capacity for large-capacity high-speed signal transmission in an optical transport network (OTN). A method and apparatus for increasing transmission capacity are needed, which can transmit a large-capacity high-speed signal in order to transmit a signal through a united OTN by adapting signals from various tributary signal networks which have been independently operated for voice, image, or data transmission. Although various types of techniques such as Time Division Multiplexing (TDM), Wavelength Division Multiplexing (WDM), and an optical Printed Circuit Board (PCB) method have been performed, the techniques have various limitations. Therefore, a method and apparatus is provided for embodying a large-capacity optical transmission network, which overcome the limitations by using a Virtual Concatenation (VC) method.

7 Claims, 12 Drawing Sheets

METHOD AND APPARATUS FOR INCREASING TRANSMISSION CAPACITY IN OPTICAL TRANSPORT NETWORK

CROSS-REFERENCE TO RELATED PATENT APPLICATION

This application claims the benefit of Korean Patent Application No. 10-2006-0122638 filed on Dec. 5, 2006 and Korean Patent Application No. 10-2007-0033348 filed on Apr. 4, 2007 in the Korean Intellectual Property Office, the disclosures of which are incorporated herein in their entirety by reference

BACKGROUND OF THE INVENTION

1. Field of the Invention

The present invention relates to large-capacity high-speed signal transmission in an optical transport network (OTN), and more particularly, to a method and apparatus for increasing a transmission capacity for an embodiment of a large-capacity back plane in an OTN.

2. Description of the Related Art

Existing various networks support various types of signal frames, transmission speeds, or multiplexing methods that are different from each other. Although conventional networks used to be independently operated, forming various types of technology fields and markets for voice, image, and data transmission, demand for a service providing a united network has gradually increased.

Accordingly, research into various types of methods of making signals in the conventional networks compatible are being carried out.

The International Telecommunications Union—Telecommunication (ITU-T) Standardization Sector indicates that an Optical Transport Hierarchy (OTH), that is, a signal hierarchy in an optical transport network (OTN), specified in G.709 is based on a conventional Synchronous Digital Hierarchy (SDH) that was developed in regard to the OTN. The OTH provides a frame structure which can support various types of networks such as the SDH, an Asynchronous Transfer Mode (ATM), or a General Framing Procedure (GFP) as tributary signals.

Meanwhile, a Synchronous Optical Network (SONET) that is an American standard of the SDH is almost the same standard and has almost the same function as the SDH, and therefore these standards will be indicated as SDH for convenience.

In order to transmit data together with an image by using a conventional transmission method that is mainly for voice transmission, high-speed and broadband will gradually be required.

A method of increasing a transmission capacity includes a Time Division Multiplexing (TDM) method and a Wavelength Division Multiplexing (WDM) method.

The OTH has a minimum bit-rate??? unit of 2.5 G, and the TDM method hierarchy is standardized with a quadruple interval up to 10G and 40G.

Although increasing speed per channel by using the above-described method may easily increase transmission speed, the method is disadvantageous for chromatic dispersion, Polarization Mode Dispersion (PMD), and non-linearity in an optical fiber.

Thus, a more common method of increasing an entire capacity is a method of combining a plurality of data per channel at a relatively low speed by using the WDM method.

A problem with this method is that the OTN receives a tributary signal including not only OTH signals but also signals from various types of networks. Also, in the case of the SDH 40 G are standardized, and therefore a 40 G signal should be received as a tributary signal from the beginning.

Thus, if all 40 G signals are transmitted through one channel, various additional compensating devices are required because of the above-described problem where the 40 G signal has to be received as a tributary signal from the beginning, so that the cost for the entire system will be increased and a system will become complicated.

On the other hand, in the OTH, a Virtual Concatenation (VC) method is standardized.

The VC method reduces wasting of frames even when receiving various tributary signals since an interval between transmission frames is increased by quadruple intervals in the OTH.

For example, when receiving 5 channels of a giga-bit Ethernet signal as tributary signals, 10 G (Optical channel Data Unit (ODU) 2/Optical channel Transport Unit (OTU) 2) has to be selected while 5 G frames are wasted since there is no additional hierarchy between 2.5 G (ODU1/OTU1) and 10 G (ODU2/OTU2) in the OTH.

A number (a natural number) of frames at low speed can be combined by using the VC method, and therefore it is possible to receive 5 G frames (ODU1-2v) by combining 2 2.5 G frames. In this case, almost no frame is wasted during the transmission.

When transmitting by using the VC method, data is loaded into 2 different frames and transmitted individually through each network, and therefore a time delay between the frames will occur.

Thus, when receiving the above-described frames, the frames should be re-transformed to an original signal, which requires a rearrangement procedure by compensating for the difference of the time delay of each virtual concatenated signal frame.

Also, transmitting such a high speed signal causes problems in optical fiber transmission and electric signal transmission.

As the speed of the signal becomes higher, loss and distortion of a signal increase according to a distance in a medium having the same permittivity. In order to solve the loss and distortion problems, a method of transmitting signals by dividing signals into parallel signals is used.

However, although it is very easy to serialize signals when receiving the signals if the original signal is multiplexed at a low speed, a problem occurs when making frames which were originally at a high speed be in parallel.

For example, when transmitting 40 G signals to 2.5 G 16 channels by making them be in parallel, if the 40 G signals are signals to which original 2.5 G 16 channel signals are multiplexed according to the OTH multiplexing method, the signals can be transmitted to the receiving end by demultiplexing the signals into 16 channels, and the 16 channels can be received in each receiving end again and multiplexed to 40 G.

However, if the 40 G signal is one data frame such as a SDH Synchronous Transport Module (STM)-256 signal from the beginning, a problem occurs when making the signal into 16 parallel channels. In this case, frequency time delays occur in each of the 16 channels as it occurred in the transmission from the optical fiber, and therefore differences in the time delay should be compensated for when receiving the signal, in order to multiplex the channels into one signal again.

Research into an optical Printed Circuit Board (PCB) is in progress as one of the methods of transmitting high-speed electric signal.

In the case of an electric signal pattern, products having a back plane up to 2.5 G are currently on the market.

However, in order to increase capacity, each electric pattern should be verified against a 10 G series signal that is a next hierarchy (of 2.5 G???).

Also, another method of increasing the capacity includes a method of increasing a number of 2.5 G ports, but a problem occurs in that a back plane layout becomes complicated. In particular, when a standard is already determined, for example, a number of ports have been already determined in an Advanced Telecom Computing Architecture (ATCA), the method of increasing the number of ports for increasing capacity can be used.

Therefore, in order to solve the above-described problems, a back plane may be designed by using an optical PCB method which uses an optical line having barely any power loss compared to the electric pattern. However, the electric-optical conversion and optical-electric conversion should be performed in the optical PCB. Also, it is difficult to obtain reliable formation up to 10 G because of a difficulty in employing the optical line in the PCB.

SUMMARY OF THE INVENTION

The present invention provides a method and apparatus for increasing transmission capacity for transmitting a large-capacity high-speed signal in order to transmit a signal through a united optical transport network (OTN) by adapting signals from various tributary signal networks which have been independently operated for voice, image, or data transmission.

According to an aspect of the present invention, there is provided an apparatus for increasing transmission capacity in an optical network, the apparatus including a transmitting unit mapping and framing an input signal to an optical transport hierarchy (OTH) signal by using a virtual concatenation (VC) method, converting the OTH signal into a plurality of multi-wavelength optical signals, and transmitting an optical signal by multiplexing; and a receiving unit demultiplexing the optical signal, converting each of the demultiplexed wavelength optical signals into electric signals, and restoring the input signal by extracting a frame and de-mapping.

According to another aspect of the present invention, there is provided a method of increasing transmission capacity in an optical network, the method including (a) mapping and framing an input signal to an OTH signal by using a VC method, converting the OTH signal into a plurality of multi-wavelength optical signals, and transmitting an optical signal by multiplexing; and (b) demultiplexing the optical signal, converting each of the demultiplexed wavelength optical signals into electric signals, and restoring the input signal by extracting a frame and de-mapping.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The attached drawings illustrate exemplary embodiments of the present invention, and are referred to in order to gain a sufficient understanding of the present invention and its merits and objectives.

Figure 1:
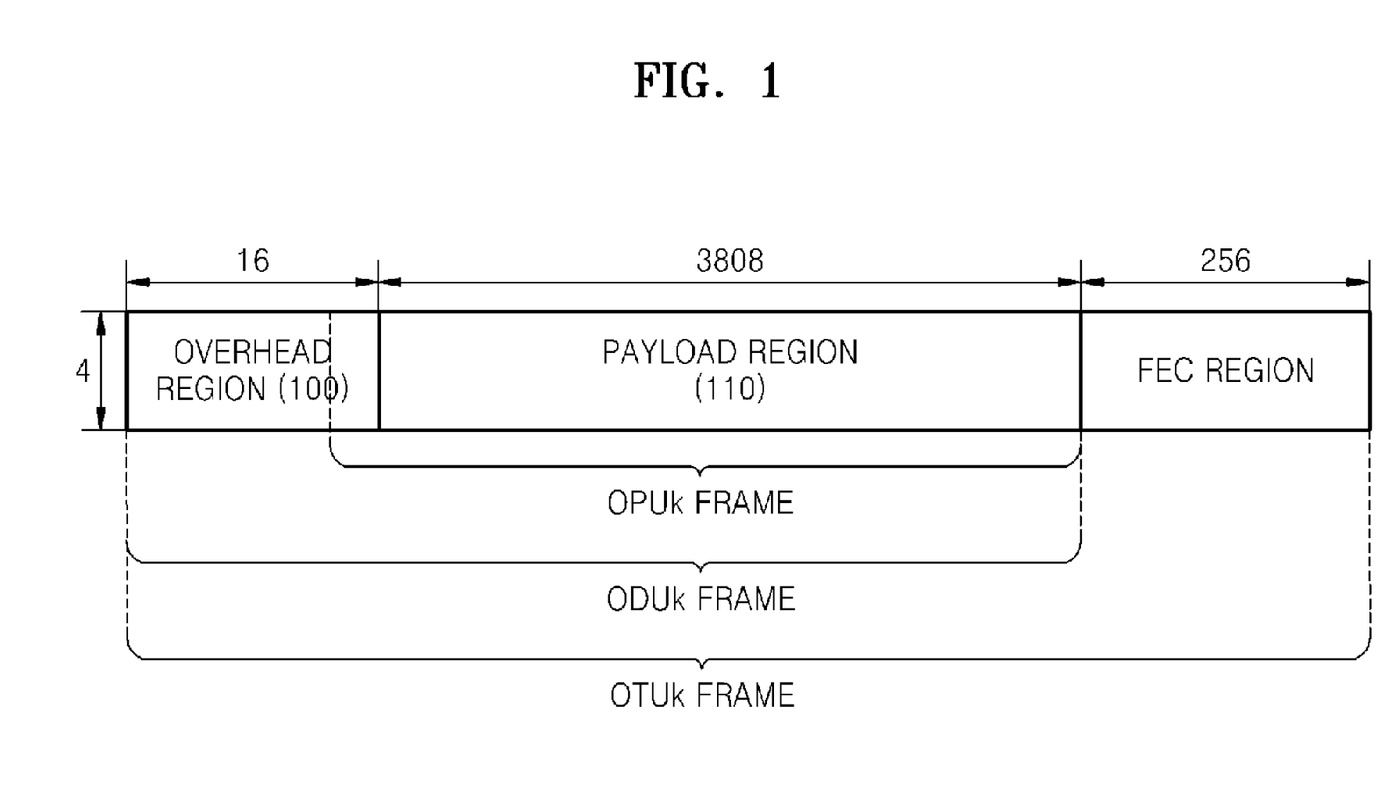
FIG. 1 illustrates a structure of an Optical channel Data Unit-k (ODUk) frame.

FIG. 1 illustrates a structure of an Optical channel Data Unit-k (ODUk) frame.

In order to understand a basic structure of a signal frame for Optical Transport Hierarchy (OTH) signal transmission, a concept of a payload and an overhead should be understood.

In order to transmit various types of tributary signals through an optical channel, a signal that is to be transmitted should be appropriately converted. Parts used for conversion include a payload 110 which is data of a tributary signal that is being carried, and an overhead 100 which employs various types of information about the payload and is transmitted through the optical channel. In other words, the overhead 100 carries information about a type of a payload for each section, a structure, a start point, and an end point, so that signal information can be confirmed in a receiving end.

Basically, the OTH is in a part converting a signal to an optical signal hierarchy by adapting various types of signals from sub-signal networks that are digital signal hierarchies such as a Synchronous Transport Module level N (STM-N), an Asynchronous Transfer Mode (ATM), a General Framing Procedure (GFP), and a Gigabit Ethernet (GbE).

The OTH includes 3 conversion hierarchies which are an optical channel hierarchy, an optical multiplexing hierarchy, and an optical transmission hierarchy. A signal transmitted to each hierarchy includes an Optical Channel (OCh), an Optical Multiplexed Section (OMS), and an Optical Transmission Section (OTS).

In particular, the OCh hierarchy is sub-divided for adaptation and multiplexing of various tributary signals, including 3 digital hierarchies and 1 optical hierarchy. In other words, the digital hierarchies include an Optical channel Payload Unit (OPU), an Optical channel Data Unit (ODU), and an Optical channel Transport Unit (OTU), and there is an optical hierarchy called an OCh hierarchy.

A signal frame standardized in an optical transport network (OTN) will be described with reference to FIG. 1.

A structure of a frame transmitted through the OTN can be an ODUk or an OTUk which are have the same two-dimensional rectangular shape having 4 rows. An expansion from the ODUk to OTUk can be performed by inserting a Forward Error Correction (FEC) encoding/decoding function since a capacity of a frame varies according to the existence of a FEC encoding area.

The ODUk will be explained here for convenience.

Meanwhile, a Synchronous Optical Network (SONET) is a standard in the US, being almost the same standard and having the same function as the Synchronous Digital Hierarchy (SDH), and therefore the term SDH will be used for these standards hereinafter.

A concatenation function in the OTN can be explained as a Virtual Concatenation (VC) of OPUk. The virtually concatenated OPUk is represented as OPUk-Xv. Here, the 'k' may be natural numbers such as 1, 2, and 3 representing a 2.5 G signal, a 10 G signal, and a 40 G signal, respectively. The 'X' may be one of the numbers from 1 to 256, and the number varies depending on how many OPUks are concatenated.

Figure 2A:
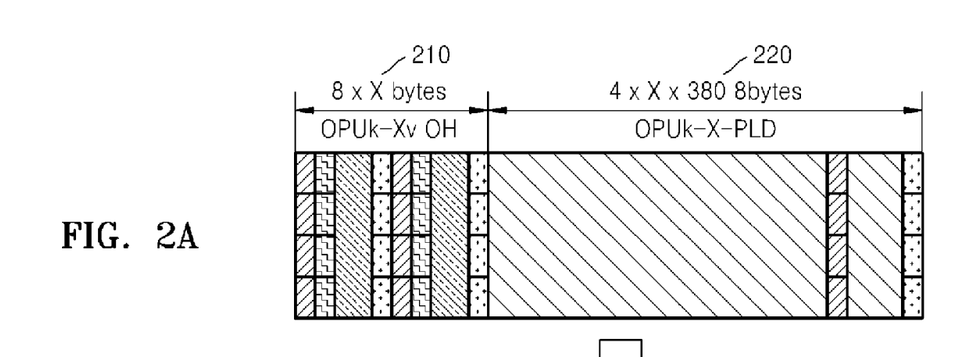
FIG. 2 illustrates a mapping relationship between a virtual concatenated Optical channel Payload Unit-Xv (OPUk-Xv) frame (a) and X-number of OPUk frames (b) which form the OPUk-Xv frame (a)
Figure 2B:
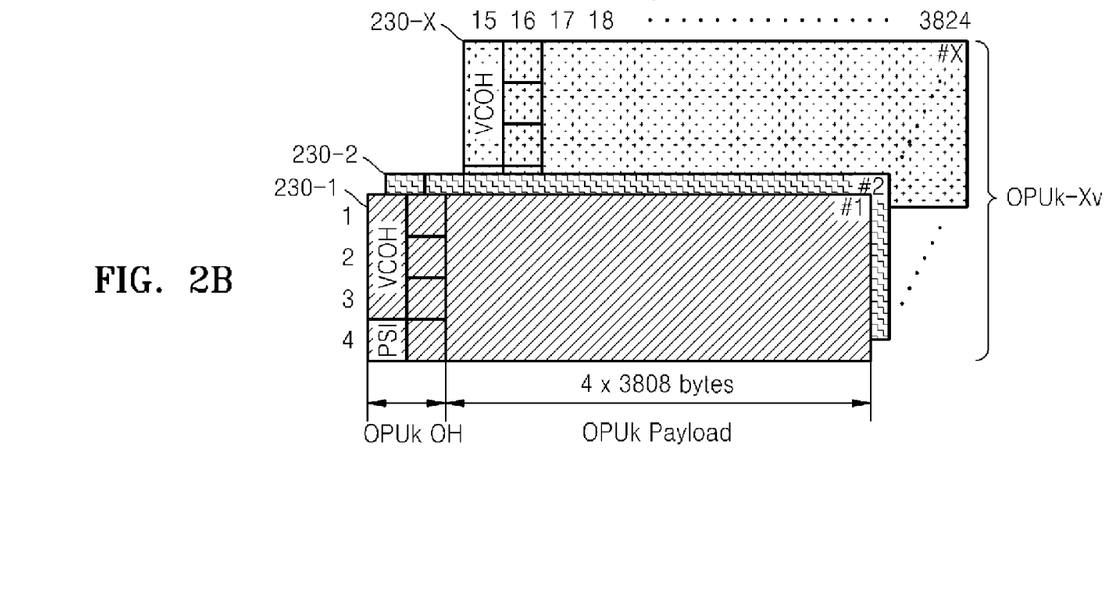

FIG. 2 illustrates a mapping relationship between a virtual concatenated OPUk-Xv frame (a) and X-number of OPUk frames (b) which form the OPUk-Xv frame (a).

The upper block (a) illustrated in FIG. 2 represents the OPUk-Xv frame.

The OPUk-Xv frame can be divided into two areas which are an OPUk-Xv overhead region (OPUk-Xv OH) 210, and an OPUk-Xv payload region (OPUk-X-PLD) 220.

One OPLk-Xv frame provides as many payload regions as possible, taking turns of each row in a region that is X-times as large as the OPUk payload.

The payload regions are called the OPUk-X-PLD 220 which are mapped with individual OPUks forming OPUk-Xv where X is the number of OPUks.

In order to form X of ODUks, an ODUk overhead is inserted into each one of X-number of OPUk frames 230-1, 230-2, ..., and 230-X which form the OPUk-Xv. The X-number of ODUks form a virtually concatenated ODUk-Xv. Then, each ODUk mapped into the ODUk-Xv frame is individually transmitted over a network. Accordingly, X-number of frames at a low speed can be transmitted.

Since the signals are individually transmitted causing a time delay, a receiving unit compensates for the time delay of the transmitted signals, re-arranges the signal, and restores the signals to the original tributary signals.

Figure 3:
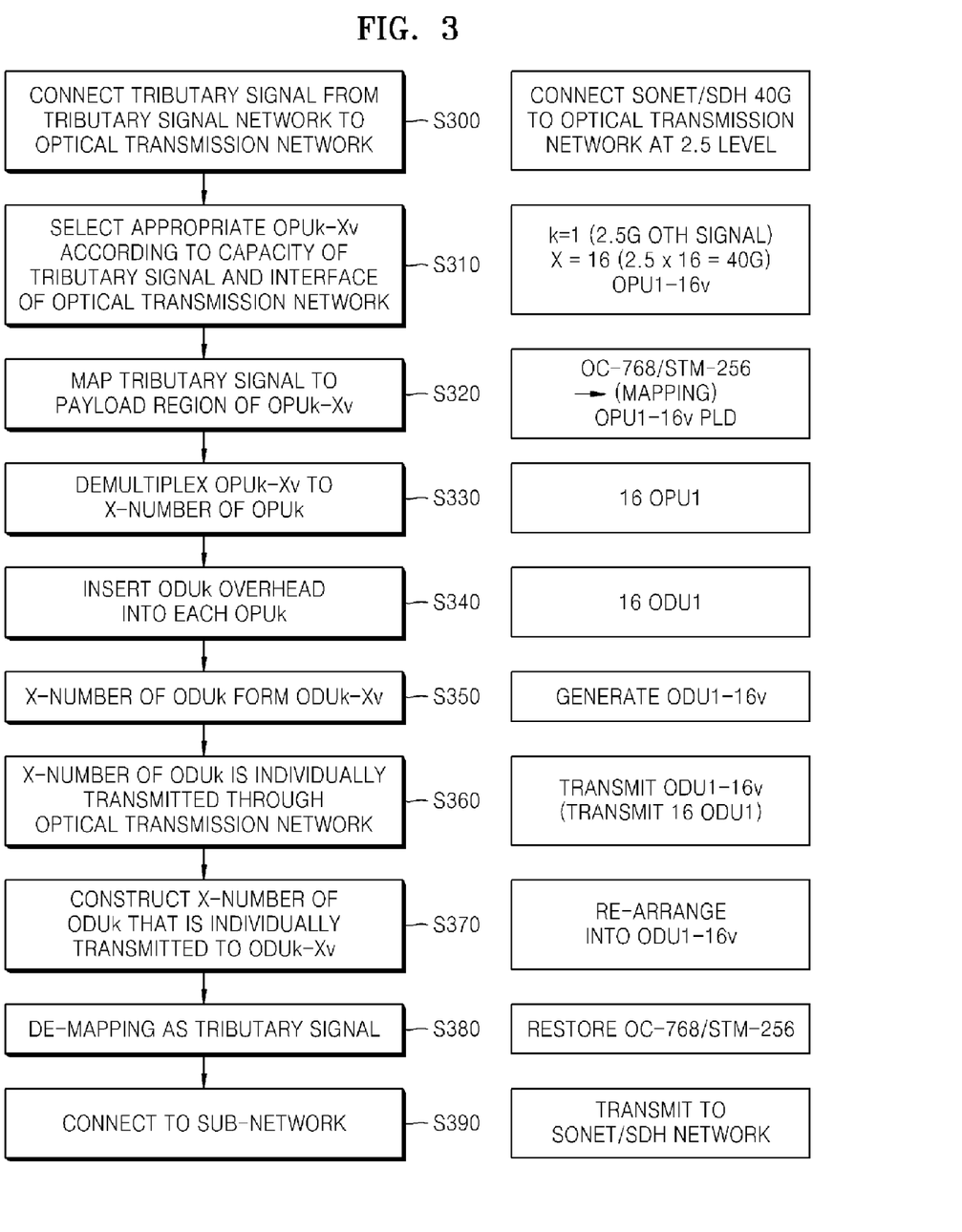
FIG. 3 is a flowchart illustrating operations of transmitting and receiving an optical signal by using a Virtual Concatenation (VC) method.

FIG. 3 is a flowchart illustrating operations of transmitting and receiving an optical signal by using a VC method.

FIG. 3 illustrates an example of adding/restoring operations of the VC method.

Various types of tributary signals are received from sub-networks, and transmitted to the OTN (operation S300).

An appropriate OPUk-Xv is selected according to a capacity of the tributary signal and an interface of the OTN (operation S310).

The tributary signal is mapped to a payload region in OPUk-Xv (operation S320).

The OPUk-Xv is demultiplexed into X-number of OPUks (operation S330).

An ODUk overhead is inserted into each OPUk (operation S340).

The X-number of OPUks form ODUk-Xv (operation S350).

Each one of the X-number of ODUks is transmitted over the OTN (operation S360).

Each individually transmitted X-number of ODUks is assembled to form ODUk-Xv (operation S370).

The ODUk-Xv is de-mapped into a tributary signal (operation S380).

The tributary signal is connected to sub-network (operation S390).

Figure 4:
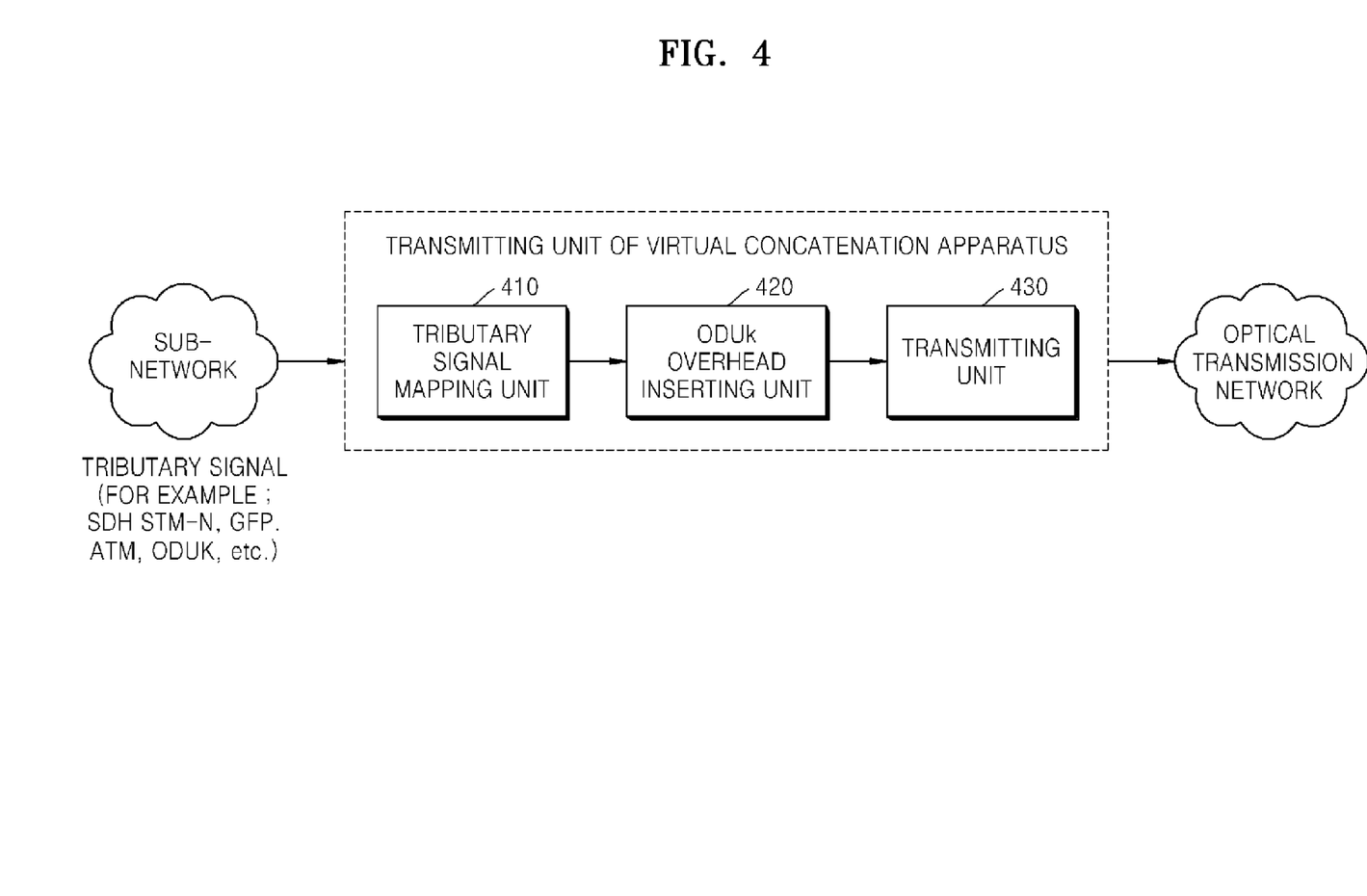
FIG. 4 illustrates a structure of a transmitting unit of a VC processing apparatus according to an embodiment of the present invention.

FIG. 4 illustrates a structure of a transmitting unit of a VC processing apparatus according to an embodiment of the present invention.

The transmitting unit includes a tributary signal mapping unit 410 mapping various types of signals to OPUk-Xv, an ODUk overhead inserting unit 420 inserting an ODUk overhead into each one of X-number of OPUks which form the mapped OPUk-Xv, and a transmitting unit 430 for connecting the signal having the overhead inserted with the OTN.

The tributary signal mapping unit 410 determines an appropriate OPUk-Xv according to a total capacity of the tributary signal and an OTN interface, and maps the tributary signal to an OPUk-Xv-PLD region.

For example, if the SDH STM-256 (40 G) signal illustrated in FIG. 3 is a tributary signal and the OTN is to be interfaced to a 2.5 G level, OPU1-16v is the most appropriate. In this case, mapping is performed in an OPU1-16v-PLD region illustrated in area 520 in FIG. 5.

A method of mapping can be a Synchronous method or an Asynchronous method.

An overhead generated from an OPUk overhead generating block and a signal received as a tributary signal are divided into bytes and mapped to a location.

When mapping the tributary signal by using the above-described method, OPU1-16v is constructed of 16 individual OPU1 frames as illustrated in FIG. 2 (b) and the 16 individual OPU1 frame signals are input to the ODUk overhead inserting unit 420.

Figure 5:
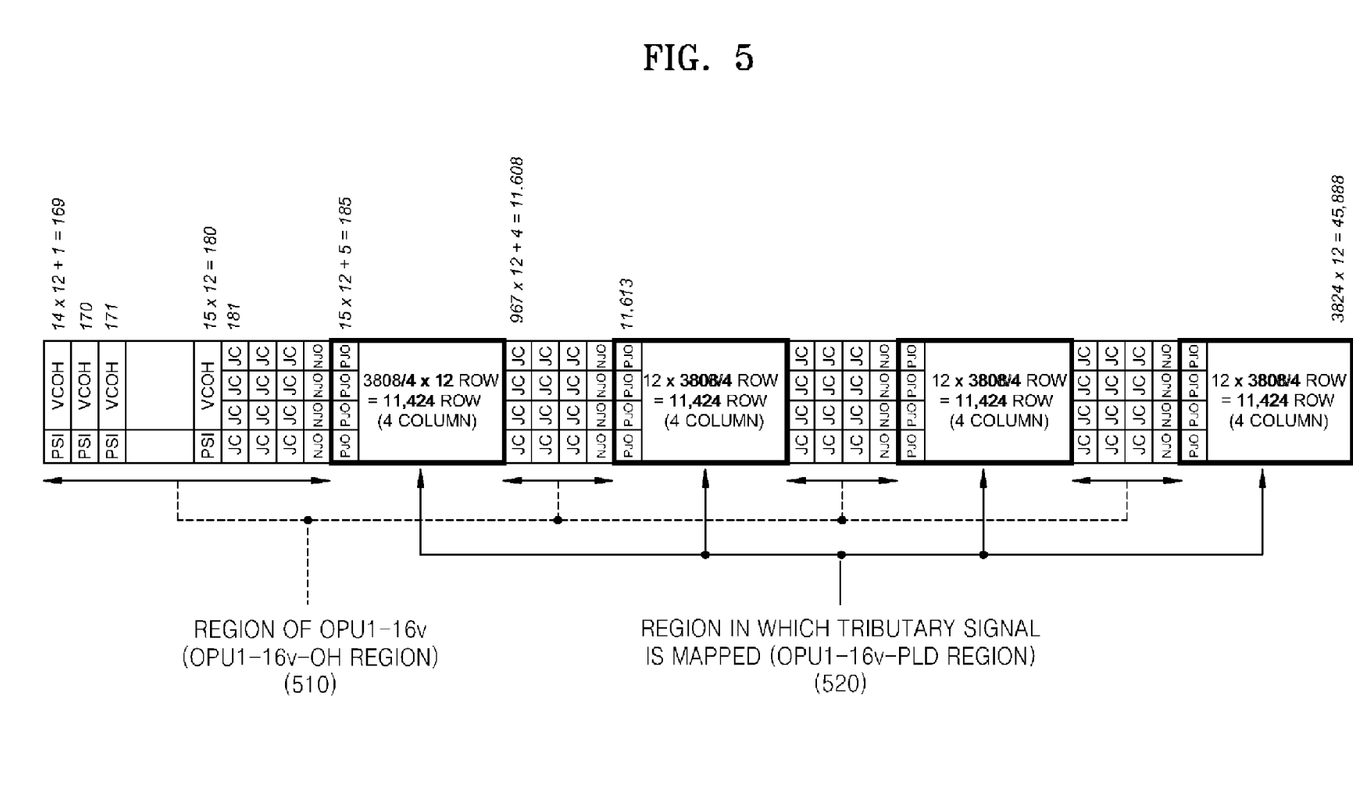
FIG. 5 illustrates an embodiment of mapping a Synchronous Transport Module (STM)-256 signal to an OPU1-16v frame.

FIG. 5 illustrates an embodiment of mapping a Synchronous Transport Module (STM)-256 signal to an OPU1-16v frame.

An OPU1-16v frame includes an OPU1-16v overhead region 510 and an OPU1-16v-PLD region 520 where a tributary signal is mapped.

Figure 6:
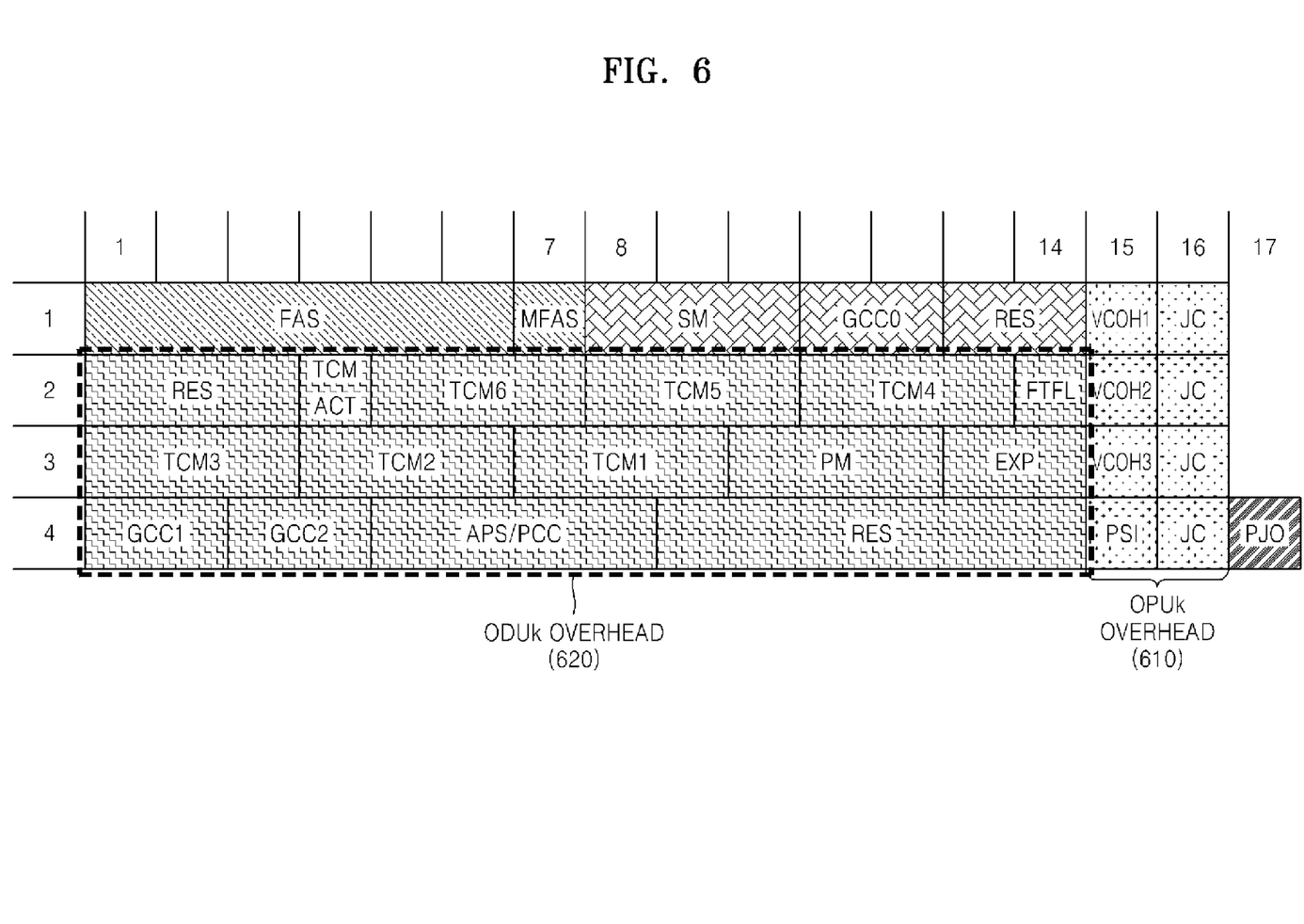
FIG. 6 illustrates a detailed view of an overhead region in an ODUk/Optical channel Transport Unit-k (OTUk) frame.

FIG. 6 illustrates a detailed view of an overhead region in an ODUk/OTUk frame.

The overhead region includes an OPUk overhead 610 located in columns 15 and 16, and an ODUk overhead 620.

Figure 7:
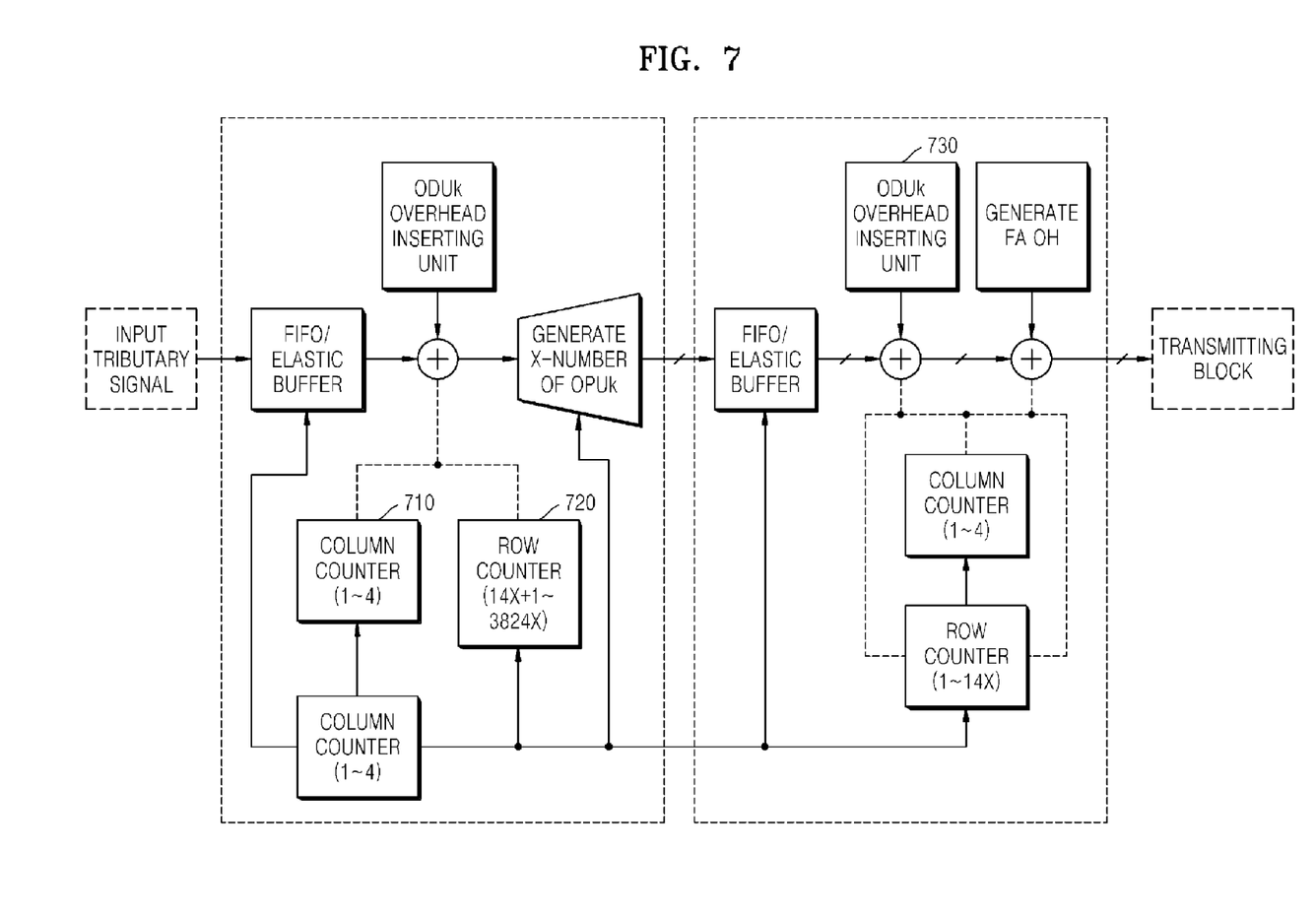
FIG. 7 is a detailed drawing illustrating the transmitting unit of the VC processing apparatus according to an embodiment of the present invention.

FIG. 7 is a detailed drawing illustrating the transmitting unit of the VC processing apparatus according to an embodiment of the present invention.

Since an OPUk-Xv is in a two-dimensional structure, counters 710 and 720 are needed for counting its columns and rows, and an overhead generated in an OPUk overhead generating block and a signal received as a tributary signal are divided into bytes and mapped to a location.

When mapping the tributary signals, an OPU1-16v includes 16 individual OPU1 frames that are illustrated in FIG. 2. The 16 individual OPU1 frame signals are input to an ODUk overhead inserting unit 730.

The ODUk frame is formed when inserting the ODUk overhead 620 as illustrated in FIG. 6.

In order to help understand FIG. 6, OPUk overheads in $15^{th}$ and $16^{th}$ rows (the OPUk overhead 510 illustrated in FIG. 5) are also illustrated.

If a Frame Alignment Overhead (FA OH) indicating a start of a frame is inserted, it is expanded to X-number of ODUk frames which can be individually transmitted.

If the frame has to be transmitted together with an OTUk, an OTUk overhead can be generated and inserted, and an FEC signal can be inserted.

Figure 8:
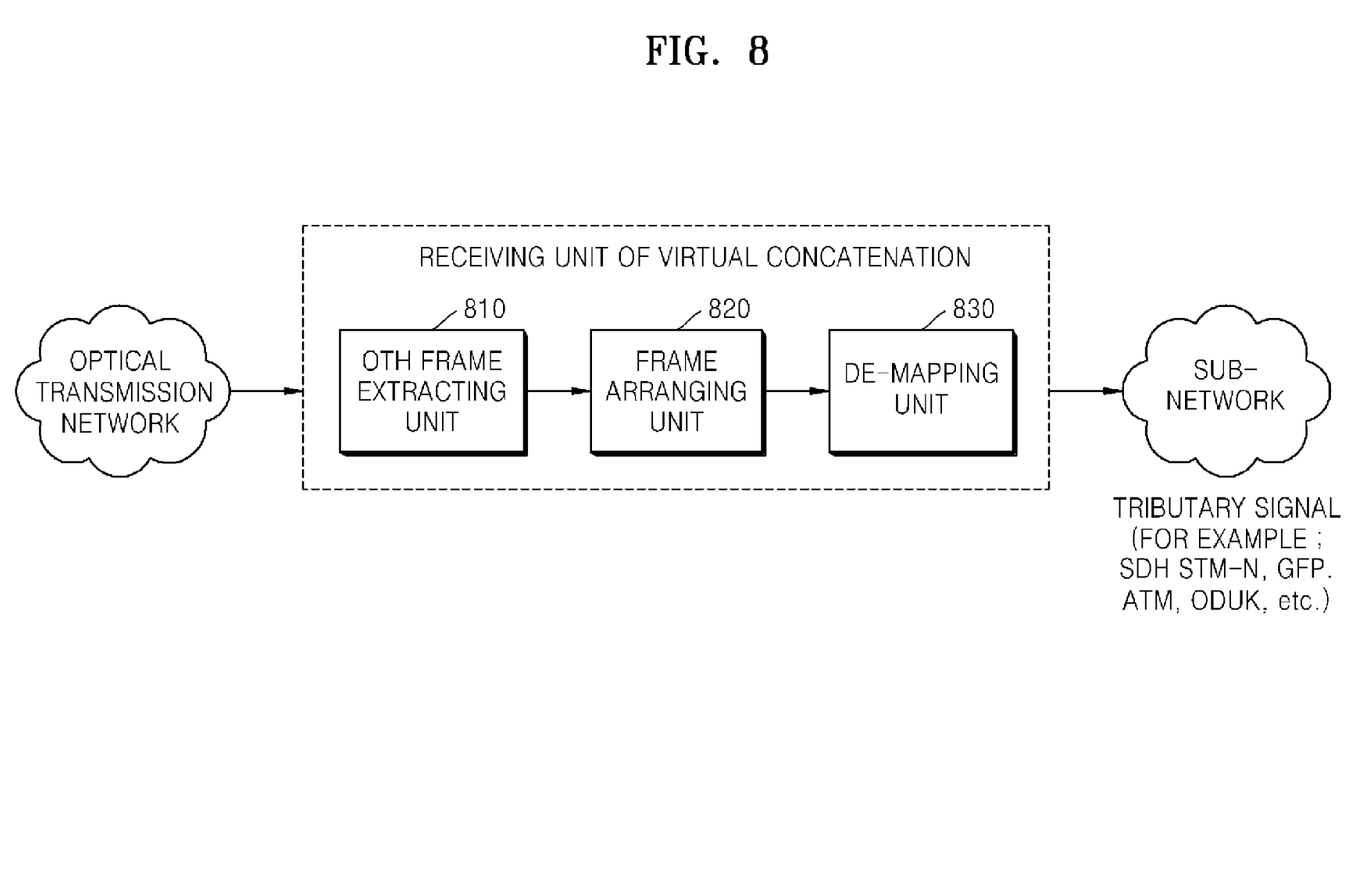
FIG. 8 illustrates a structure of a receiving unit of the VC processing apparatus according to an embodiment of the present invention.

FIG. 8 illustrates a structure of a receiving unit of the VC processing apparatus according to an embodiment of the present invention.

The receiving unit of the VC processing apparatus includes a frame extracting unit 810 extracting a start of a frame, a frame arranging unit 820 re-arranging a frame by compensating for time-delay differences of virtually concatenated ODUk frames from various networks, a de-mapping unit 830 de-mapping the re-arranged frame to an original tributary signal.

Figure 9:
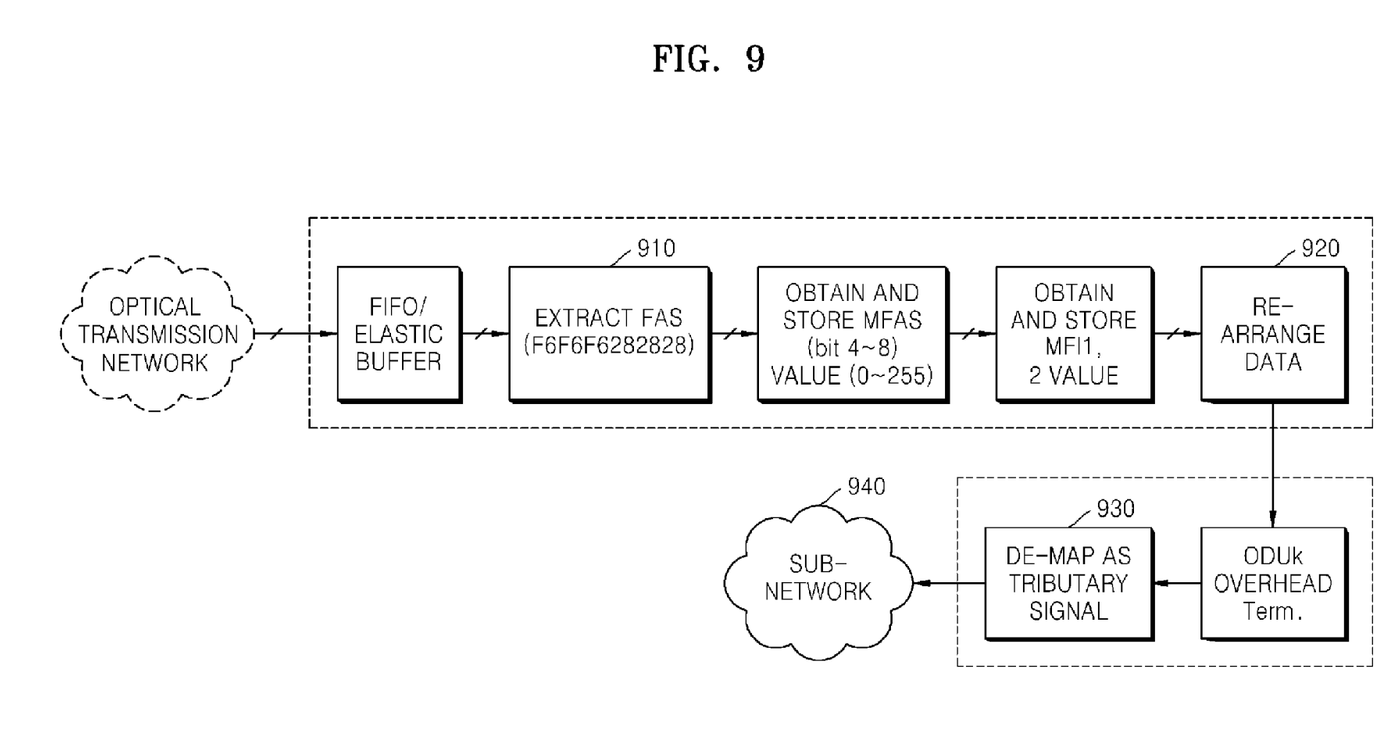
FIG. 9 is a detailed drawing illustrating the receiving unit of the VC processing apparatus according to an embodiment of the present invention.

FIG. 9 is a detailed drawing illustrating the receiving unit of the VC processing apparatus according to an embodiment of the present invention.

Extracting a frame includes operations of extracting a frame alignment signal (FAS) (operation 910), re-arranging data (operation 920), de-mapping the data to a tributary signal (operation 930), and connecting to a sub-network (940).

Figure 10:
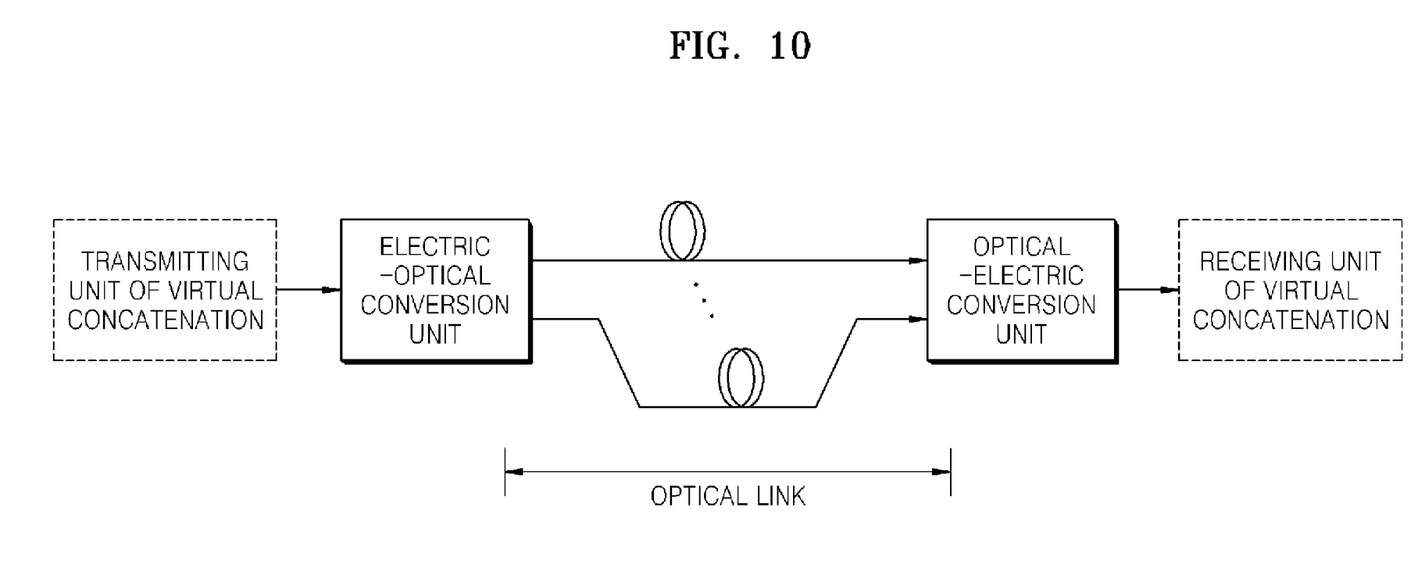
FIG. 10 illustrates an embodiment in which the VC processing apparatus according to the present invention is applied to an optical link.

FIG. 10 illustrates an embodiment in which the VC processing apparatus according to the present invention is applied to an optical link.

FIG. 10 illustrates an embodiment in which the transmitting unit of the VC processing apparatus illustrated in FIG. 4 and the receiving unit of the VC processing apparatus illustrated in FIG. 8 is directly applied to an optical link.

Here, the transmitting unit 430 illustrated in FIG. 4 includes an optical transmitting device for electric-optical converting.

The X-number of ODUk that are mapped with an ODUk-Xv are loaded to each X-number of waveforms to be transmitted. If it is a case where a 40 G signal is divided into 16 2.5 G signals to be virtually concatenated, a long distance transmission can be performed having advantages in terms of chromatic dispersion, Polarization Mode Dispersion (PMD), and non-linearity by using a 2.5 G instead of using the 40 G.

Figure 11:
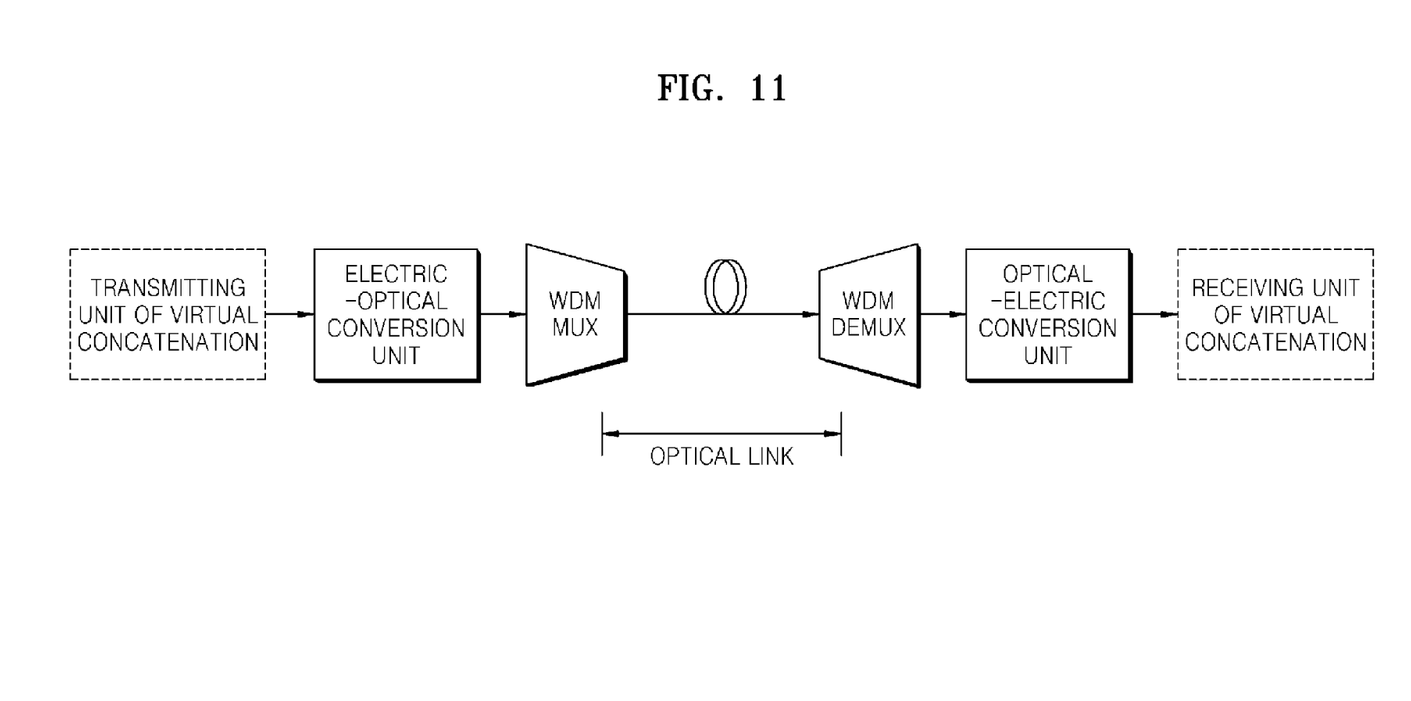
FIG. 11 illustrates another embodiment in which the VC processing apparatus according to the present invention is applied to an Optical Transport Network (OTN) based on a Wavelength Division Multiplexing (WDM) method.

FIG. 11 illustrates another embodiment in which the VC processing apparatus according to the present invention is applied to an Optical Transport Network (OTN) based on a Wavelength Division Multiplexing (WDM) method.

FIG. 11 illustrates a structure of transmitting all virtually concatenated X-number of signals to one optical fiber by using the WDM method.

Optical fibers can be saved and a 40 G signal can be transmitted a long-distance by using the above-described method.

When transmitting an electric signal, the transmitting unit and receiving unit of the VC processing apparatus can be used. For example, when transmitting a 40 G series signal, the amount of loss of the signal is large and distortion occurs if a transmitting distance is equal to or greater than 1~2 cm, and therefore only a very short distance can be used for transmission by using a point-to-point method. However, when transmitting the signal by virtually concatenating into 16 2.5 G signals, a board connection or a board-to-board connection can be done because the signal is transmitting on 2.5 G line.

Figure 12:
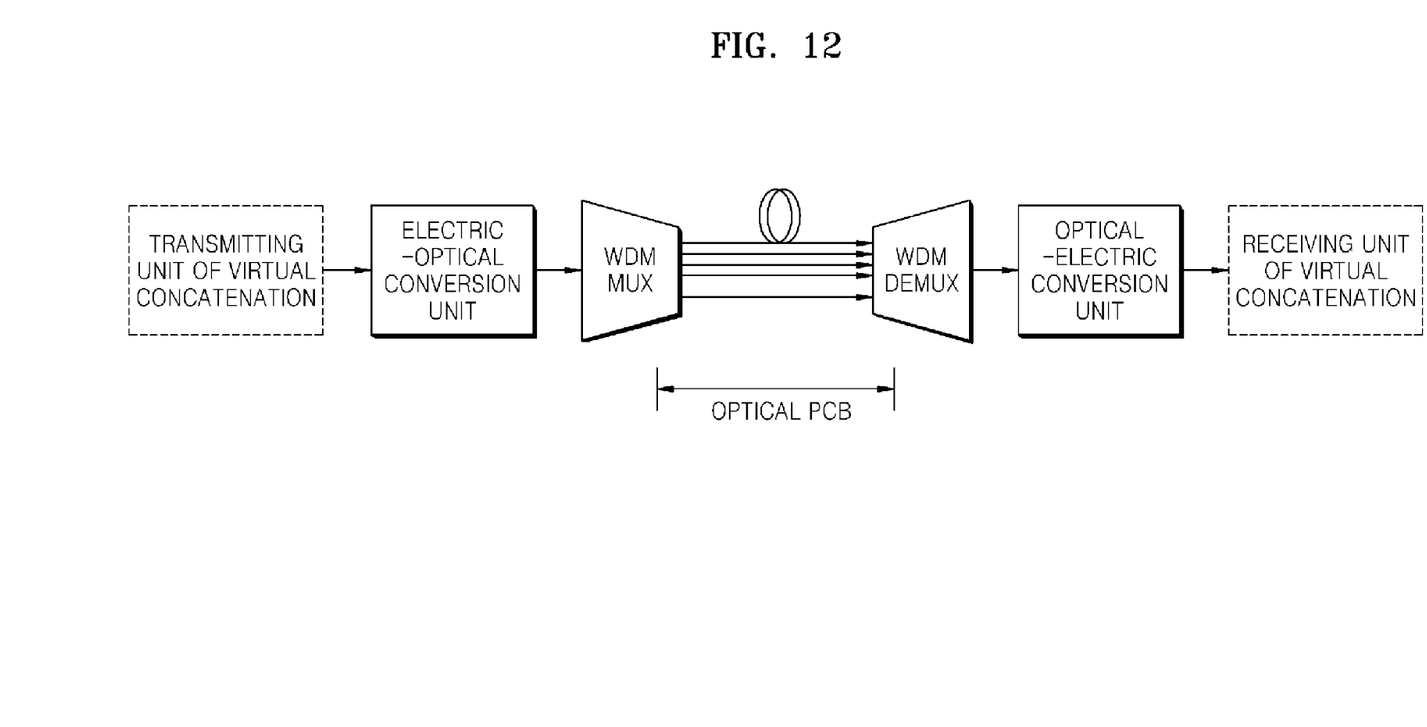
FIG. 12 illustrates another embodiment in which the VC processing apparatus according to the present invention is applied to a backplane by combining the WDM method and an optical PCB method in order to compose a large-capacity switching fabric.

FIG. 12 illustrates another embodiment in which the VC processing apparatus according to the present invention is applied to a backplane by combining the WDM method and an optical PCB method in order to compose a large-capacity switching fabric.

In particular, in order to make a large capacity multi-connection apparatus, which is placed in a connection part between a sub-network and an optical network, the capacity of each board should be increased. However, in order to increase the capacity, the number of ports output to a backplane should be increased or a unit transmission speed of each port should be increased.

However, when increasing the capacity of a standardized system such as an Advanced Telecom Computing Architecture (ATCA) system, increasing the number of ports cannot be done. In this case, a transmission speed per port should be increased. However, if a speed is fast as in 40 G, board-to-board signal transmission is difficult to perform in backplane. Thus, in this case, the transmission speed per port can be decreased to 2.5 G by using a VC method.

In addition, if a backplane is formed by using the optical PCB method, the WDM method can be performed at the same time, and therefore 16 virtually concatenated channels can be transmitted to one port. This is only an example and varying the capacity of the transmission per port can also be possible. Accordingly, the flexibility of the entire capacity will be increased.

As described above, according to a method and apparatus for increasing transmission capacity by using a VC method, embodying an optical transmission network for large capacity high speed transmission can be possible by adapting signals from various tributary signal networks which used to be operated individually when transmitting voice, images, and data.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An apparatus for increasing transmission capacity in an optical network, the apparatus comprising:
    a transmitting unit mapping and framing an input signal to an optical transport hierarchy (OTH) signal by using a virtual concatenation (VC) method, converting the OTH signal into a plurality of multi-wavelength optical signals, and transmitting an optical signal by multiplexing;
    a receiving unit demultiplexing the optical signal, converting each of the demultiplexed wavelength optical signals into electric signals, and restoring the input signal by extracting a frame and de-mapping, and
    an optical printed circuit board (PCB) having a plurality of ports, the multiplexed optical signal being transmitted from the transmitting unit to the receiving unit via the ports.

2. The apparatus of claim 1, wherein the input signal is at least one of a synchronous transport module level N (STM-N), a synchronous digital hierarchy (SDH), a general framing procedure (GFP), and an asynchronous transfer mode (ATM).

3. The apparatus of claim 1, wherein the OTH signal is at least one of optical channel payload units (OPU) 1, OPU 2, and OPU 3.

4. The apparatus of claim 1, further comprising a transmitting path transmitting the optical signal.

5. The apparatus of claim 1, wherein the transmitting unit and the receiving unit comprise pluralities of units.

6. The apparatus of claim 1, wherein the transmitting unit maps and frames the input signal to a plurality of OTH signals, and the transmitting unit comprises:
    a signal mapping unit mapping the input signal to the plurality of OTH signals;
    an overhead inserting unit inserting an overhead into each of the mapped plurality of OTH signals;

a plurality of electric-optical conversion units converting the OTH signals having the overhead inserted therein, into multi-wavelength optical signals that are different from each other; and a wavelength multiplexing unit multiplexing the converted multi-wavelength optical signals.

7. The apparatus of claim 1, wherein the receiving unit comprises:

a wavelength demultiplexing unit demultiplexing the optical signal;

a plurality of optical-electric conversion unit converting the demultiplexed optical signals of each wavelength into a plurality of electric signals;

a frame extracting unit extracting a frame from the plurality of electric signals by searching for a predetermined code value;

a frame arranging unit compensating for a time delay of each frame; and a de-mapping unit de-mapping the time delay compensated frame.

* * * * *